(12) United States Patent
Dubroca et al.

(10) Patent No.: US 9,435,955 B2
(45) Date of Patent: Sep. 6, 2016

(54) OPTICAL GUIDE WITH SUPERIMPOSED GUIDANCE ELEMENTS AND MANUFACTURING METHOD

(71) Applicant: OPTINVENT, Rennes (FR)

(72) Inventors: Guilhem Dubroca, Rennes (FR); Pascal Benoit, Rennes (FR); Xavier Hugel, Rennes (FR); Khaled Sarayeddine, Rennes (FR)

(73) Assignee: OPTINVENT, Rennes (FR)

( * ) Notice: Subject to any disclaimer, the term of this patent is extended or adjusted under 35 U.S.C. 154(b) by 135 days.

(21) Appl. No.: 14/365,163

(22) PCT Filed: Dec. 6, 2012

(86) PCT No.: PCT/EP2012/074693
§ 371 (c)(1),
(2) Date: Jun. 13, 2014

(87) PCT Pub. No.: WO2013/087518
PCT Pub. Date: Jun. 20, 2013

(65) Prior Publication Data
US 2014/0334777 A1    Nov. 13, 2014

(30) Foreign Application Priority Data
Dec. 13, 2011    (FR) ..................................... 11 61561

(51) Int. Cl.
| G02B 6/26 | (2006.01) |
| G02B 6/42 | (2006.01) |
| G02B 6/34 | (2006.01) |
| G02B 6/00 | (2006.01) |
| F21V 8/00 | (2006.01) |
| G02B 6/12 | (2006.01) |

(52) U.S. Cl.
CPC ................. *G02B 6/262* (2013.01); *G02B 6/00* (2013.01); *G02B 6/34* (2013.01); *G02B 6/0076* (2013.01); *G02B 2006/12166* (2013.01); *Y10T 29/49885* (2015.01)

(58) Field of Classification Search
CPC ...................................................... G02B 6/0076
See application file for complete search history.

(56) References Cited

U.S. PATENT DOCUMENTS

| 6,351,594 B1 * | 2/2002 | Nakamura ......... G02B 27/0031 |
| | | 362/558 |
| 7,570,859 B1 * | 8/2009 | DeJong ................ G02B 6/0028 |
| | | 385/133 |

FOREIGN PATENT DOCUMENTS

| WO | 2008153528 A1 | 12/2008 |
| WO | 2009076125 A1 | 6/2009 |

* cited by examiner

*Primary Examiner* — Uyen Chau N Le
*Assistant Examiner* — Chad Smith
(74) *Attorney, Agent, or Firm* — Bachman & LaPointe, P.C.

(57) ABSTRACT

An optical guide comprises an injection zone intended to inject into the optical guide a light signal and an extraction zone intended to provide the light signal after transport by the optical guide. The optical guide comprises, in a superposed manner, at least two guidance elements. In a zone situated between the injection zone and the extraction zone, the guidance elements are partially separated from one another by a semi-reflective coating of length, in the direction or propagation of the light signal in the optical guide, dependent on a minimum angle of incidence of the light signal and on the thickness of at least one of the guidance elements that the semi-reflective coating separates.

13 Claims, 5 Drawing Sheets

OPTICAL GUIDE WITH SUPERIMPOSED GUIDANCE ELEMENTS AND MANUFACTURING METHOD

BACKGROUND

The present invention concerns an optical guide comprising an injection zone intended to inject a light signal into the optical guide and an extraction zone intended to provide the light signal after transport by the optical guide.

Typically, an optical guide comprises a guidance zone in which the light signal is transported by reflection from the injection zone to the extraction zone. The most usual case is where the light signal is reflected successively on two parallel flat faces of a slide. The distance between the external faces of the optical guide on which the light signal is reflected from the injection zone to the extraction zone is called the thickness of the optical guide.

The image, or light signal, to be transported is injected into the optical guide thanks to an injection device. The image consists of a light beam issuing from a source that may be a matrix of LCD (Liquid Cristal Display) pixels illuminated by a light source. It may also be a matrix of OLED (Organic Light-Emitting Diode) pixels. An optical system based on lenses enables projecting this image in the form of a collimated beam, which is then introduced into the optical guide via the injection zone.

The size of the injection zone is dependent on the thickness of the optical guide, which itself is dependent on the size of the extraction zone and the required resolution, and therefore the overall size of the injection device is such too.

SUMMARY

It is desirable to provide a solution that allows, for a given size of extraction zone, reducing the overall size of the injection device, which means reducing the size of the injection zone.

It is in particular desirable to provide a solution that enables the luminance perceived in the light signal provided via the extraction zone to be uniform.

It is in particular desirable to provide a solution that is simple to implement and at low cost.

The invention concerns an optical guide comprising an injection zone intended to inject a light signal into the optical guide and an extraction zone intended to provide the light signal after transport by the optical guide. The optical guide is such that it comprises, in a superimposed manner, at least two guidance elements. The optical guide is furthermore such that, in a zone situated between the injection zone and the extraction zone, the guidance elements are partially separated from each other by a semi-reflective coating with a length, in the direction of propagation of the light signal in the optical guide, that is dependent on a minimum angle of incidence of the light signal and on the thickness of at least one of the guidance elements that the semi-reflective coating separates.

Thus, for a given size of the extraction zone, the injection zone is reduced and consequently the overall size of the injection device serving to provide the light signal via the injection zone is reduced.

According to a particular embodiment, the length of the semi-reflective coating is such that it allows at least two rebounds of the light signal on said semi-reflective coating.

Thus, the uniformity of the luminance perceived in the light signal provided via the extraction zone is increased, in particular when the reflectivity and transmissivity of the semi-reflective coating are not equal, and when the absorption of the semi-reflective coating is negligible with respect to the transmissivity and the reflectivity (absorption less than 5%).

According to a particular embodiment, the reflectivity and the transmissivity of the semi-reflective coating are substantially equal.

Thus, the uniformity of the luminance perceived in the light signal provided via the extraction zone is increased.

According to a particular embodiment, the optical guide comprises, in a superimposed manner, at least three guidance elements forming a succession of guidance elements, a semi-reflective coating partially separating each guidance element from the following guidance element. The optical guide is furthermore arranged so that the light signal transmitted by a semi-reflective coating is transmitted by the following semi-reflective coating without intermediate reflection.

Thus, the reduction in the overall size of the injection device is increased. In addition, it is possible to use guidance elements, such as slides, manufactured from the same material and with the same thickness, which simplifies and reduces the manufacturing cost of the optical guide.

According to a particular embodiment, each semi-reflective coating has a reflectivity dependent on its position in the succession of guidance elements, a semi-reflective coating transmitting the light signal transmitted by another semi-reflective coating having a stronger reflectivity than the one of this semi-reflective coating.

Thus, the uniformity of the luminance perceived in the light signal provided by the extraction zone is increased.

According to a particular embodiment, the guidance elements have the same thickness.

Thus, the manufacture of the optical guide is simple and the cost is reduced.

According to a particular embodiment, the guidance elements consist of the same material.

Thus, the simplicity of manufacture of the optical guide and the reduction in cost are increased.

According to a particular embodiment, the guidance elements are manufactured from different materials, and their thicknesses are dependent on their refractive indices and the minimum angle of incidence of the light signal.

Thus, it is possible to make a choice of material for each of the guidance elements that depends on its use in the implementation context of the optical guide. For example, a guidance element that shall also comprise a structure for enabling fixing the injection device may consist of a material offering mechanical properties suited to this constraint, whereas each other guidance element may be manufactured from a material withstanding lower mechanical stresses, and therefore less expensive. The flexibility in manufacture of the optical guide is thus increased.

According to a particular embodiment, the optical guide comprises, in a superimposed manner, at least three guidance elements forming a succession of guidance elements, a semi-reflective coating partially separating each guidance element from the following guidance element. The optical guide is furthermore arranged so that the light signal transmitted by one semi-reflective coating between one guidance element and the following guidance element does not enter said following guidance element without reflection.

Thus, the reduction in the overall size of the injection device is increased.

According to a particular embodiment, the optical guide comprises a group of at least three guidance elements arranged in a superimposed manner so as to form a succession of guidance elements, a semi-reflective coating partially separating each guidance element from the following guidance element. The optical guide is furthermore arranged so that the light signal transmitted without reflection by one semi-reflective coating is transmitted by the following semi-reflective coating. The optical guide is furthermore such that it comprises at least one other guidance element, a semi-reflective coating partially separating this other guidance element from said group of guidance elements. The optical guide is furthermore arranged so that the light signal transmitted by one semi-reflective coating of the group of guidance elements does not enter said other guidance element without reflection.

According to a particular embodiment, in order for the light signal transmitted by one semi-reflective coating between one guidance element and the following guidance element to not enter the following guidance element without reflection, said guidance element and said following guidance element are partially separated by a reflective coating.

Thus, by managing deposits of semi-reflective coating and reflective coating, it is possible to use guidance elements, such as slides, of the same size, and the manufacture thereof is simplified.

According to a particular embodiment, so that the light signal transmitted by one semi-reflective coating between one guidance element and the following guidance element does not enter the following guidance element without reflection, said following guidance element is absent from a zone of the optical guide where the light signal is transmitted by said semi-reflective coating.

Thus, the cost of material is reduced.

The invention also concerns a method for manufacturing an optical guide comprising an injection zone intended to inject a light signal into the optical guide and an extraction zone intended to provide the light signal after transport by the optical guide. The manufacturing method is such that it comprises the following steps: obtaining at least two guidance elements; depositing, in a zone situated between the injection zone and the extraction zone, a semi-reflective coating on each guidance element except one, the semi-reflective coating having a length, in the direction of propagation of the light signal in the optical guide, dependent on a minimum angle of incidence of the light signal and on the thickness of at least one of the guidance elements that said semi-reflective coating is intended to separate; and assembling the guidance elements in a superimposed manner, so that each semi-reflective coating separates two guidance elements.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

To allow reducing the overall size of the injection device, it is proposed that the optical guide comprise at least two guidance elements partially separated by a semi-reflective coating in a zone situated between the injection zone and the extraction zone. This semi-reflective coating allows increasing the size of the pupil with respect to a single-slide optical guide, which means, for a fixed pupil dimension, reducing the overall size of the injection device. In order to join the guidance elements together in a single object while allowing optical propagation, it is necessary to use an interstitial material. This is because any air space between the guidance elements thus assembled is to be avoided, these causing the appearance of total internal reflections, while the purpose of the assembly is to allow the light to propagate in the various guidance elements partially separated by semi-reflective coatings. The interstitial material extends over the entire useful surface of the guidance elements, including the zones covered by the semi-reflective coating. This interstitial material may for example be glue, in order to hold the guidance elements together. This interstitial material shall have a refractive index preventing any total internal reflection, even for a minimum angle of incidence $\alpha_{min}$ of the light signal. The reflections caused by the difference in index between the material of the guidance elements and the interstitial material are advantageously minimised by ensuring that the difference in index is not greater than 0.1. So that the size of the details of the projected image to be distinguished by the user is around 0.03°, the parallelism between the guidance elements is around 0.01°.

In the following description, the guidance elements are slides with parallel faces. Other guidance elements may be used in the context of the invention, in particular a guidance element comprising, on the same face, in a juxtaposed manner, the injection zone and the extraction zone. In this case, the semi-reflective coating separating the guidance elements allows a rebound of the light signal before extraction.

Figure 1:
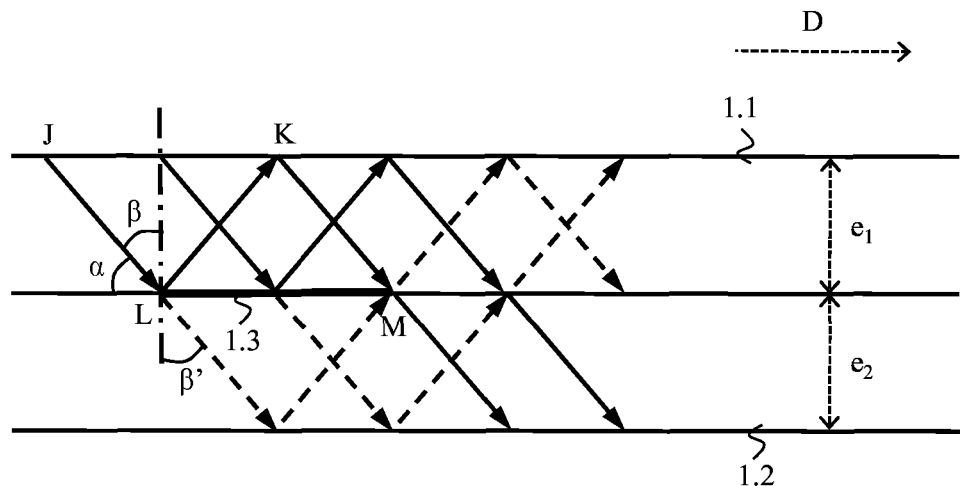
FIG. 1 schematically illustrates a portion of a first optical guide according to the present invention.

A portion of a first optical guide according to the present invention is schematically illustrated in FIG. 1 according to a view in cross section in the direction of propagation D of a light signal in the optical guide.

The first optical guide comprises an injection device (not shown) intended to inject the light signal into the optical guide and an extraction device (not shown) intended to provide the light signal after transport by the optical guide, for example to the eye of a user.

The first optical guide comprises a first slide 1.1 of thickness $e_1$ and a second slide of thickness $e_2$. The first 1.1 and second 1.2 slides are superimposed and their faces are parallel. The light signal propagates in the optical guide by reflection on said faces of the slides.

The arrangement of the extraction device defines an extraction zone (not shown) for the light signal on a face of the first slide 1.1 or of the second slide 1.2.

The arrangement of the injection device defines an injection zone for the light signal on a first face of the first slide 1.1. This injection zone is represented by the segment [J,K] in FIG. 1. The rays of the light signal are injected into the first slide 1.1 at an angle $\alpha$ with respect to the faces of the first slide 1.1, which corresponds to an angle $\beta$ with respect to the normal to these faces. In other words: $\beta=\pi/2-\alpha$.

The minimum angle of incidence $\alpha_{min}$ of the rays of the light signal is the one shown in FIG. 1. The projection of the point J onto the second face of the first slide 1.1 at the minimum angle of incidence $\alpha_{min}$ is represented by the point L. The one of the point K is represented by the point M.

The first 1.1 and second 1.2 slides are partially separated by a semi-reflective coating 1.3, which means this semi-reflective coating 1.3 is disposed in a zone of the optical guide situated between the injection zone and the extraction zone. Thus, the rays of the light signal injected into the first slide 1.1 are partially reflected by the semi-reflective coating 1 in order to continue their propagation in the first slide 1.1, and partially transmitted by the semi-reflective coating 1.3 in order to continue their propagation in the second slide 1.2. Thus, part of the light signal remains in the first slide 1.1 and another part enters the second slide 1.2. The semi-reflective coating 1.3 extends at least over a surface represented by the segment [L,M] in FIG. 1.

In FIG. 1, injected rays are represented by arrows in solid lines, likewise the rays resulting from reflection by the semi-reflective coating 1.3 of these injected rays, and the rays resulting from the transmission by the semi-reflective coating 1.3 of these injected rays are represented by arrows in broken lines.

For the light signal to fill the first slide 1.1, the imprint of the light signal on the faces of the first slide 1.1 is of length $l_1$ in the direction of propagation D of the light signal in the optical guide, with $l_1$ such that:

$$l_1 = \frac{2e_1}{\tan\alpha_{min}}$$

For the light signal to fill the second slide 1.2, the imprint of the light signal on the faces of the second slide 1.2 is of length $l_2$ in the direction of propagation D of the light signal in the optical guide, with $l_2$ such that:

$$l_2 = \frac{2e_2}{\tan\alpha_{min}}$$

when the first 1.1 and second 1.2 slides consist of the same material.

The imprint $l_{tot}$ of the light signal for the whole optical guide shall, under these circumstances, satisfy the following condition:

$$l_{tot} \geq \frac{2(e_1 + e_2)}{\tan\alpha_{min}} = l_1 + l$$

where l represents the length [L,M] of the semi-reflective coating 1.3 in the direction of propagation D of the light signal in the optical guide. The length l is then such that:

$$l \geq \frac{2e_2}{\tan\alpha_{min}}$$

The length l is thus defined as a function of the thickness $e_2$ of the second slide 1.2 and the minimum angle of incidence $\alpha_{min}$ of the light signal.

In a particular embodiment, in order for the light signal to fill the optical guide more uniformly, the thickness $e_1$ of the first slide 1.1 is equal to the thickness $e_2$ of the second slide 1.2. Thus the luminance perceived by the user is made more uniform.

When the first 1.1 and second 1.2 slides are manufactured from different materials, the ratio of their thicknesses is:

$$\frac{e_2}{e_1} = \frac{n_2}{n_1} \frac{\sqrt{1 - \left(\frac{n_2}{n_1}\right)^2 \sin^2\beta_{max}}}{\cos\beta_{max}}$$

where $n_1$ represents the refractive index of the first slide 1.1, $n_2$ represents the refractive index of the second slide 1.2 and $\beta_{max}$ corresponds to the value of the angle $\beta$ when the angle $\alpha$ takes the value $\alpha_{min}$. Thus, when the slides are manufactured from different materials, their thicknesses depend on their refractive indices and the minimum angle of incidence of the light signal By manufacturing for example the first slide 1.1 from polymethyl methacrylate (PMMA) and the second slide 1.2 from polycarbonate, a minimum angle of incidence $\alpha_{min}$ equal to 23.5°, a ratio $e_2/e_1$ of around 1.16 is obtained.

The uniformity of luminance may be increased when the semi-reflective coating 1.3 transmits substantially as much as it reflects, which means there exists, at a maximum, a difference of 20% between the transmissivity t and the reflexivity r of the semi-reflective coating 1.3. In a preferred embodiment, the transmissivity t and reflexivity r of the semi-reflective coating 1.3 are equal. The same applies to the optical guides described hereafter in relation to FIGS. 2 and 3.

It is recalled that: t+r=1−a, where a represents the absorption of the light signal by the semi-reflective coating 1.3.

In a particular embodiment, the length l is defined so as to enable the light signal injected into the optical guide to perform at least two rebounds on the semi-reflective coating 1.3. This attenuates the effect of any difference between transmissivity t and reflexivity r of the semi-reflective coating 1.3. The same applies to the optical guides described hereafter in relation to FIGS. 2, 3 and 4.

In a preferred embodiment, the length l is defined so as to enable the light signal injected into the optical guide to perform two rebounds on the semi-reflective coating 1.3.

Thus, taking for example a thickness of first 1.1 and second 1.2 slides equal to 2 mm and a minimum angle of incidence $\alpha_{min}$ equal to 23.5°, an imprint of length 9.2 mm is obtained in the direction of propagation of the light signal in the optical guide. It means that the minimum length of the semi-reflective coating 1.3 is 9.2 mm. This length may then be established at 18.4 mm to enable the light signal injected to perform two rebounds on the semi-reflective coating 1.3 in order to improve the uniformity of the luminance perceived by the user. Such a length of 18.4 mm is suited to the incorporation of the optical guide in spectacles (glasses), for which the distance between the injection device and the extraction device is around 50 mm.

Figure 2:
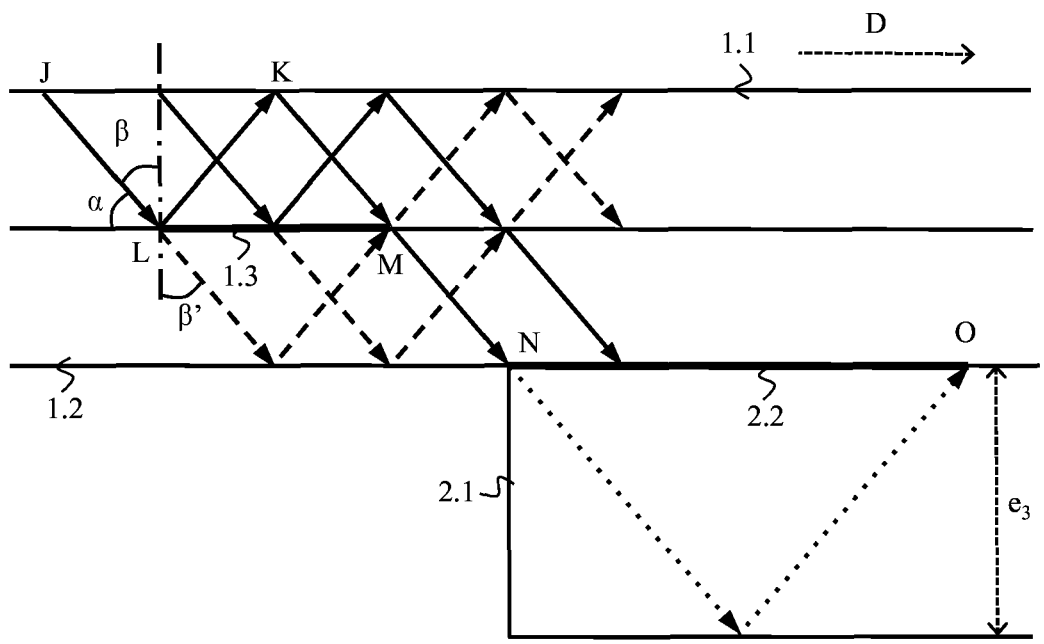
FIG. 2 schematically illustrates a portion of a second optical guide according to the present invention FIG. 3 schematically illustrates a portion of a third optical guide according to the present invention FIG. 4 schematically illustrates a portion of a fourth optical guide according to the present invention FIG. 5 schematically illustrates a method for manufacturing an optical guide according to the present invention.

A portion of a second optical guide according to the present invention is schematically illustrated in FIG. 2 in a view in cross section in the direction of propagation D of a light signal in the optical guide.

The second optical guide comprises the first slide 1.1, the second slide 1.2, the semi-reflective coating 1.3 and a third slide 2.1 of thickness $e_3$. The first 1.1, second 1.2 and third 2.1 slides are superimposed and their faces are parallel. The light signal propagates in the optical guide by reflections on said faces of the slides. As in the context of the first optical guide in FIG. 1, the first 1.1 and second 1.2 slides are separated by the semi-reflective coating 1.3.

In the context of this second optical guide, the first 1.1, second 1.2 and third 2.1 slides consist of the same material, and the thickness $e_1$ of the first slide 1.1 is equal to the thickness $e_2$ of the second slide 1.2, and the thickness $e_3$ of the third slide 2.1 is equal to the sum of the thicknesses $e_1$ and $e_2$. When the first 1.1, second 1.2 and third 2.1 slides consist of different materials, their thicknesses depend on their refractive indices and the minimum angle of incidence of the light beam. When another slide is added to the optical guide, so as to be superimposed on the third slide 2.1, this other slide has a thickness equal to the sum of the thicknesses $e_1$, $e_2$ and $e_3$. And so on for adding other slides.

The second 1.2 and third 2.1 slides are partially separated by a semi-reflective coating 2.2 similar to the semi-reflective coating 1.3. The arrangement of the third slide 2.1 and of the semi-reflective coating 2.2 is such that the rays transmitted by the semi-reflective coating 1.3 are entirely reflected by the opposite face of the second slide 1.2. The other rays of the light signal injected into the first slide 1.1 and propagated in the second slide 1.2 and the rays reflected in the second slide 1.2 are partially transmitted by the semi-reflective coating 2.2, in order to continue their propagation in the third slide 2.1. Thus, part of the light signal remains in the first slide 1.1, another part enters the second slide 1.2 and is reflected therein, and yet another part enters the third slide 2.1 and is reflected therein. In FIG. 2, injected rays are represented by arrows in solid lines, as are the rays resulting from the reflection of these injected rays by the semi-reflective coating 1.3, the rays resulting from the transmission of these injected rays by the semi-reflective coating 1.3 are represented by arrows in long broken lines, and the rays resulting from the transmission by the semi-reflective coating 2.3 are represented by arrows in short broken lines.

The semi-reflective coating 2.2 extends at least over a zone represented by a segment [N,O] in FIG. 2, and the edge of the third slide 2.1 is positioned at the point N, the point N corresponding to the projection of the point M onto the second face of the second slide 1.2 at the minimum angle of incidence in this second slide, which means the angle $\alpha_{min}$ when the slides consist of the same material. The third slide 2.1 is then absent from the zone of the optical guide where the light signal is transmitted by said semi-reflective coating. The semi-reflective coating 2.2 extends from the point N and the length [N,O] of the semi-reflective coating 2.2 in the direction of propagation D of the light signal in the optical guide is then such that, represented by $l_3$:

$$l_3 \geq \frac{2e_3}{\tan\alpha_{min}}$$

The length [N,O] of the semi-reflective coating 2.2 is thus defined as a function of the thickness $e_3$ of the third slide 2.1 and of the minimum angle of incidence $\alpha_{min}$ of the light signal.

Figure 3:
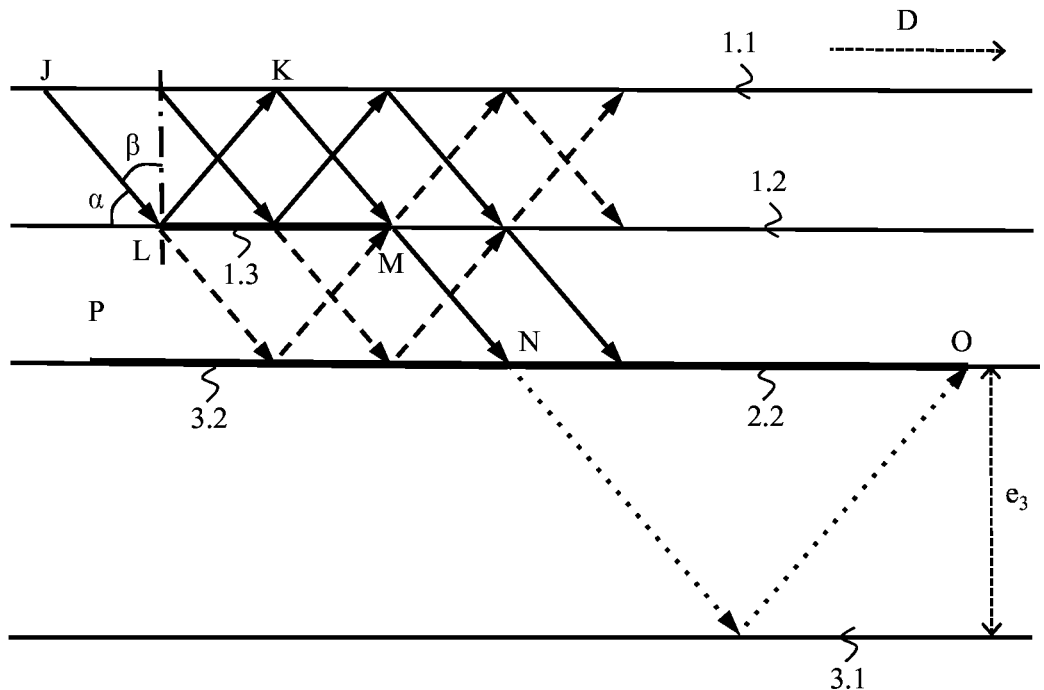

A portion of a third optical guide according to the present invention is schematically illustrated in FIG. 3 in a view in cross section in the direction of propagation D of a light signal in the optical guide. This third optical guide is a variant of the second optical guide described above in relation to FIG. 2.

The third optical guide comprises the first slide 1.1, the second slide 1.2 and a third slide 3.1 of thickness $e_3$, and the semi-reflective coatings 1.3 and 2.2. The semi-reflective coating 2.2 is disposed on the segment [N,O], as presented above in relation to FIG. 2.

Unlike the second optical guide described above in relation to FIG. 2, the edge of the third slide 3.1 is not positioned at the point N. In order for the rays transmitted by the semi-reflective coating 1.3 to be entirely reflected by the opposite face of the second slide 1.2, the second 1.2 and third 3.1 slides are partially separated by an entirely reflective coating 3.2. This entirely reflective coating 3.2 extends over a surface represented in FIG. 3 by the segment [P, N]. This zone shall at least extend over a surface that would be represented in the view in cross section in FIG. 3 by a segment [P',N], where P' is the projection of the point L on the opposite face of the second slide 1.2 at a maximum angle of incidence $\alpha_{max}$ of the light signal.

The second and third optical guides then comprise, superimposed, at least three slides forming a succession of slides, a semi-reflective coating partially separating each slide from the following slide in the succession of slides. These optical guides are arranged so that the light signal transmitted by a semi-reflective coating between one slide and the following slide does not enter the following slide without reflection.

Figure 4:
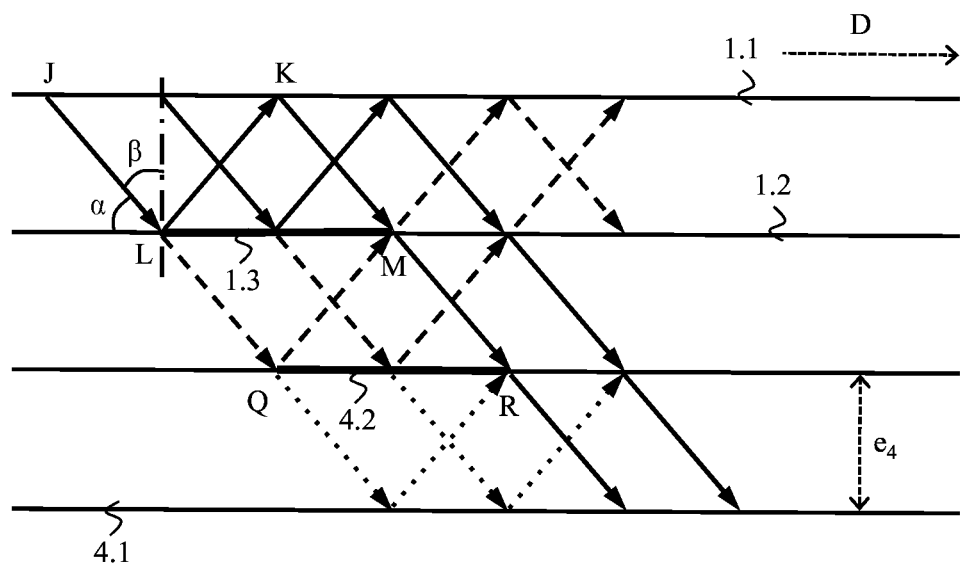

A portion of a fourth optical guide according to the present invention is schematically illustrated in FIG. 4 in a view in cross section in the direction of propagation D of a light signal in the optical guide.

The second optical guide comprises the first slide 1.1, the second slide 1.2, the semi-reflective coating 1.3 and a third slide 4.1 of thickness $e_4$. The first 1.1, second 1.2 and third 4.1 slides are superimposed and their faces are parallel. The light signal propagates in the optical guide by reflections on said faces of the slides. As in the context of the first optical guide in FIG. 1, the first 1.1 and second 1.2 slides are separated by the semi-reflective coating 1.3.

The second 1.2 and third 4.1 slides are separated by a semi-reflective coating 4.2. The semi-reflective coating 4.2 extends over a zone represented by the segment [Q,R] in FIG. 4. The point Q corresponds to the projection of the point L on the second face of the second slide 1.2 at the minimum angle of incidence of this second slide 1.2, i.e. the angle $\alpha_{min}$ when the slides consist of the same material. The point R corresponds to the projection of the point M on the second face of the second slide 1.2 at the minimum angle of incidence in this second slide 1.2.

The fourth optical guide then comprises, in a superimposed manner, at least three slides forming a succession of slides, a semi-reflective coating partially separating each slide from the following slide. This optical guide is arranged so that the light signal transmitted without intermediate reflection by a semi-reflective coating is transmitted by the following semi-reflective coating. There is therefore no reflection between the two semi-reflective coatings.

The uniformity of luminance may be increased, when the semi-reflective coating 1.3 has a transmissivity t equal to twice its reflexivity r, which means $t=\tfrac{2}{3}$ and $r=\tfrac{1}{3}$ ignoring the absorption by the semi-reflective coating 1.3, and when the semi-reflective coating 4.2 has a transmissivity t equal to its reflexivity r, which means $t=r=\tfrac{1}{2}$ ignoring the absorption by the semi-reflective coating 4.2.

Each semi-reflective coating then has a reflectivity dependent on its position in the succession of slides, one semi-reflective coating transmitting the light signal transmitted by another semi-reflective coating having a higher reflectivity than the one of this semi-reflective coating.

In other words, when the semi-reflective coating at a position in the succession of slides, starting from the semi-reflective coating struck first by the light signal, has an index k, with k=1, ..., n−1 where n is the number of slides, then this semi-reflective coating has a reflectivity r such that:

$$r = \frac{1}{n-k+1}$$

It is possible to combine the principles disclosed above in relation to FIG. 4 and FIG. 2 or 3. In this case, the optical guide comprises a group of at least three slides arranged in a superimposed manner in order to form a succession of slides, a semi-reflective coating partially separating each slide from the following slide, the optical guide arranged so that the light signal transmitted without reflection by a semi-reflective coating is transmitted by the following semi-reflective coating. This group corresponds to the arrangement presented above in relation to FIG. 4. The optical guide further comprises at least one other slide, a semi-reflective coating partially separating this other slide from the group of slides, the optical guide arranged so that the light signal transmitted by a semi-reflective coating of the group of slides does not enter said other slide without reflection. This arrangement corresponds to the one presented above in relation to FIG. 2 or 3.

The first, second, third or fourth optical guides presented above are preferably intended to be integrated in spectacles (glasses). The reduction in the overall size of the injection device also involves the reduction in the overall size of the lenses used upstream of the injection device, and therefore overall reducing the size of these spectacles. The comfort of the user wearing these spectacles is thus increased.

It should be noted that the light signal can be injected directly by the injection zone represented by the segment [J,K]. For example, the injection device is surface mounted on the external face of the first slide 1.1, which means the face of the first slide 1.1 that is not positioned against the second slide 1.2.

It should be noted that the light signal may be injected indirectly by the injection zone represented by the segment [J,K]. For example, the light signal may previously undergo reflections on at least one of the faces of one or other of the slides.

Various arrangements of the optical guide with regard to the positioning of the injection device are thus schematically depicted in FIGS. 6A to 6G.

FIGS. 6A to 6F schematically illustrate an optical guide comprising first 6.1 and second 6.2 parallel-face slides mounted in a superimposed manner. The optical guide further comprises an extraction zone 6.3. The optical guide also comprises a semi-reflective coating 6.4, disposed as previously described in relation to FIG. 1.

Figure 6A:
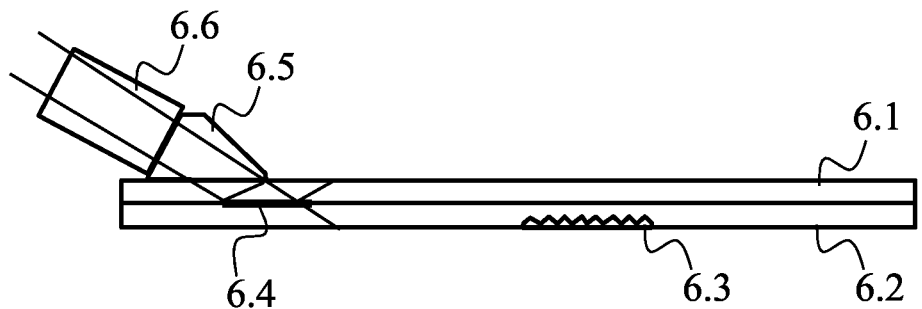
FIGS. 6A to 6G schematically illustrate arrangements of the optical guide with regard to the positioning of an injection device.

In the representation in FIG. 6A, the optical guide is used in association with an injection device comprising an injection piece 6.5 surface mounted on the first slide 6.1 and a set 6.6 of lenses, which enables projecting an image in the form of a collimated beam. The set 6.6 of lenses transmits the collimated beam to the injection piece 6.5, which injects it into the first slide 6.1. The injected beam is next partially reflected and partially transmitted by the semi-reflective coating 6.4, as already described.

Figure 6B:
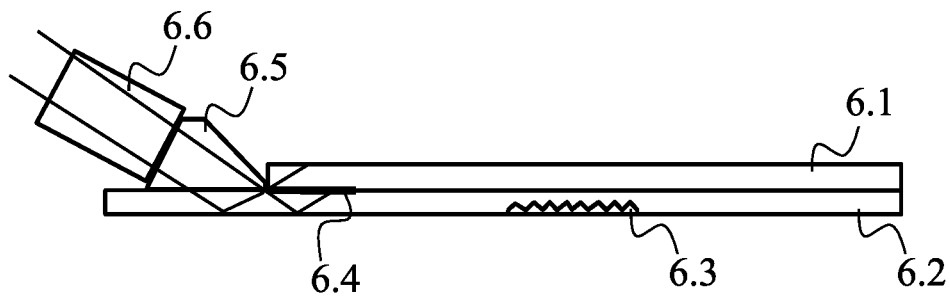

In the representation in FIG. 6B, the optical guide is used in association with an injection device comprising an injection piece 6.5 surface mounted on the second slide 6.2. The injection piece 6.5 is mounted on the face of the second slide 6.2 which is mounted against the first slide 6.1. The first slide 6.1 therefore comprises a recess that enables the injection piece 6.5 to be placed against the second slide 6.2. The injection device also comprises a set 6.6 of lenses, which enables projecting an image in the form of a collimated beam. The set 6.6 of lenses transmits the collimated beam to the injection piece 6.5, which injects it into the second slide 6.2. The injected beam is next reflected by the opposite face of the second slide 6.2 before striking the semi-reflective coating 6.4.

Figure 6C:
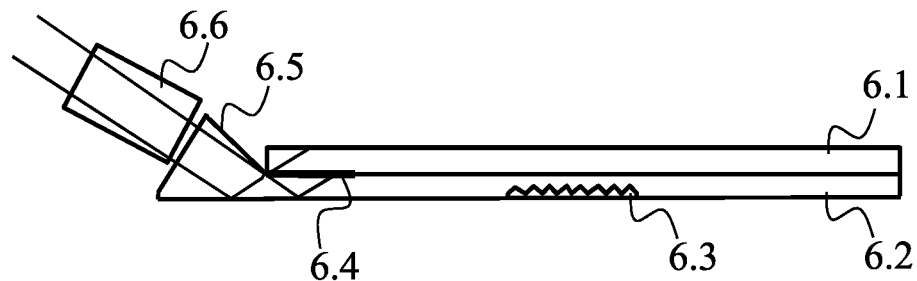

In the representation in FIG. 6C, the optical guide is used in association with an injection device comprising an injection piece 6.5 that corresponds to a protrusion on the second slide 6.2. This protrusion extends on the same side as the one where the first slide 6.1 is mounted on the second slide 6.2. The injection device also comprises a set 6.6 of lenses, which enables projecting an image in the form of a collimated beam. The set 6.6 of lenses transmits the collimated beam to the injection piece 6.5, which injects it into the second slide 6.2. The injected beam is then reflected by the opposite face of the second slide 6.2 before striking the semi-reflective coating 6.4.

Figure 6D:
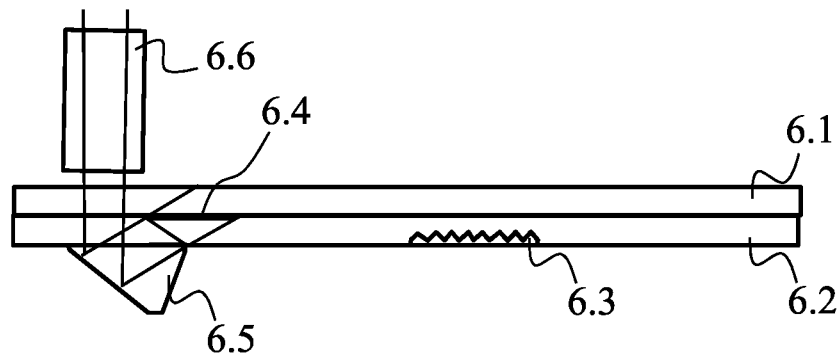

In the representation in FIG. 6D, the optical guide is used in association with an injection device comprising an injection piece 6.5 surface mounted on the second slide 6.2. The injection piece 6.5 is mounted on the face of the second slide 6.2 opposite the one that is mounted against the first slide 6.1. The injection device also comprises a set 6.6 of lenses, which enables projecting an image in the form of a collimated beam. The set 6.6 of lenses is mounted on the side of the face of the first slide 6.1 opposite to the one that is mounted against the second slide 6.2. The set 6.6 of lenses transmits the collimated beam to the injection piece 6.5 via the first 6.1 and second 6.2 slides. The collimated beam thus passes through the first 6.1 and 6.2 slides perpendicular to the faces of the first 6.1 and the second 6.2 slides. The collimated beam is reflected against a face of the injection piece 6.5 and is injected by reflection into the first slide 6.1. The injected beam is then partially reflected and partially transmitted by the semi-reflective coating 6.4, as already described.

Figure 6E:
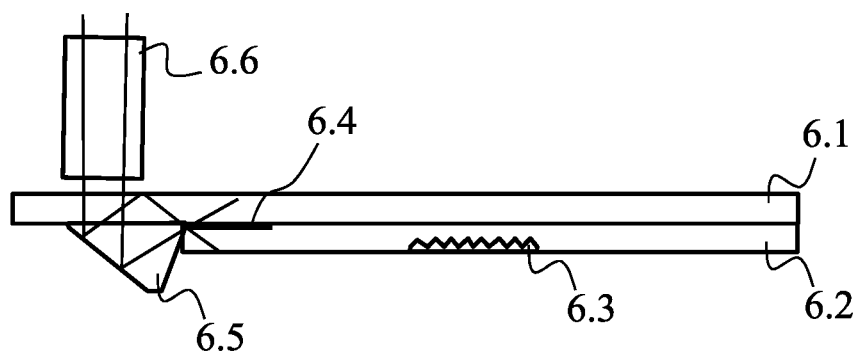

In the representation in FIG. 6E, the optical guide is used in association with an injection device comprising an injection piece 6.5 surface mounted on the first slide 6.1. The injection piece 6.5 is mounted on the face of the first slide 6.1 which is mounted against the second slide 6.2. The second slide 6.2 therefore comprises a recess than enables the injection piece 6.5 to be placed against the first slide 6.1. The injection device also comprises a set 6.6 of lenses, which enables projecting an image in the form of a collimated beam. The set 6.6 of lenses is mounted on the side of the face of the first slide 6.1 opposite to the one that is mounted against the second slide 6.2. The set 6.6 of lenses transmits the collimated beam to the injection piece 6.5 via the first slide 6.1. The collimated beam thus passes through the first slide 6.1 perpendicular to the faces of the first slide 6.1. The collimated beam is reflected against a face of the injection piece 6.5 and is injected by reflection into the first slide 6.1. The injected beam is then reflected by the opposite face of the first slide 6.1 before striking the semi-reflective coating 6.4.

Figure 6F:
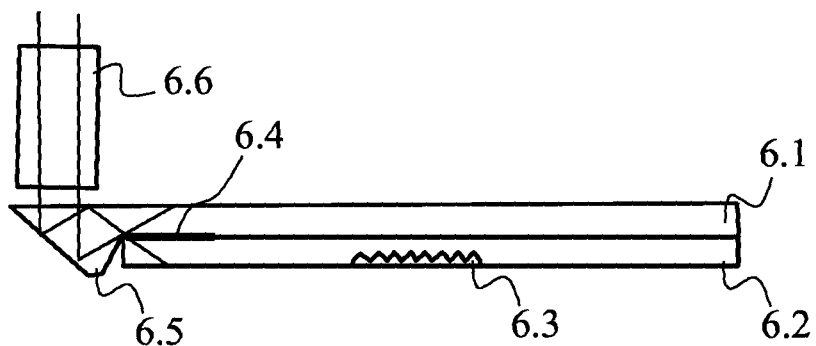

In the representation in FIG. 6F, the optical guide is used in association with an injection device comprising an injection piece 6.5 that corresponds to a protrusion on the first slide 6.1. This protrusion extends on the same side as the one where the second slide 6.2 is mounted on the first slide 6.1. The injection device also comprises a set 6.6 of lenses, which enables projecting an image in the form of a collimated beam. The set 6.6 of lenses transmits the collimated beam to the injection piece 6.5 via one of the parallel faces of the first slide 6.1. The collimated beam is reflected against one face of the injection piece 6.5 and is then reflected, before striking the semi-reflective coating 6.4, by the face of the first slide 6.1 through which the collimated beam emerging from the set 6.6 of lenses passes.

Figure 6G:
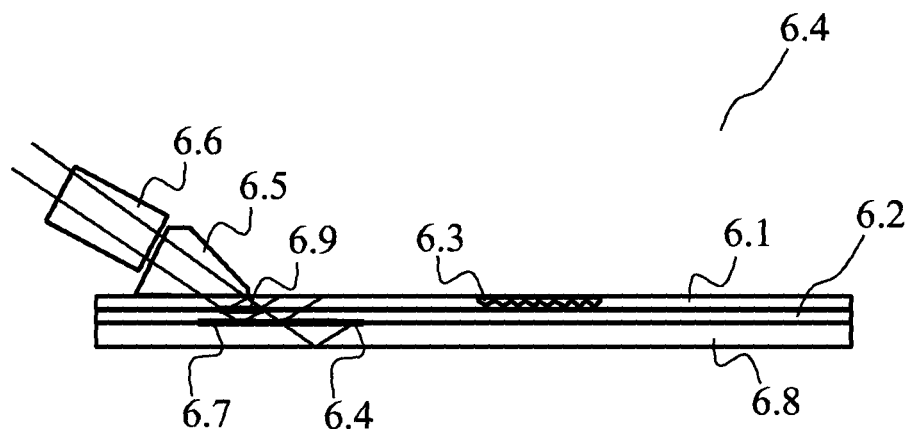

FIG. 6G schematically illustrates an optical guide comprising first 6.1, second 6.2 and third 6.8 parallel-face slides mounted in a superimposed manner. The optical guide further comprises an extraction zone 6.3. The optical guide also comprises a first semi-reflective coating 6.4 placed between the second 6.2 and third 6.8 slides, a second semi-reflective coating 6.9 placed between the first 6.1 and second 6.2 slides and a reflective coating 6.7. The first 6.4 and second 6.9 semi-reflective coatings and the reflective coating 6.7 are disposed as previously described in relation to FIG. 3.

The optical guide is used in association with an injection device comprising an injection piece 6.5 surface mounted on the first slide 6.1 and a set 6.6 of lenses, which enables projecting an image in the form of a collimated beam. The set 6.6 of lenses transmits the collimated beam to the injection piece 6.5 that injects it into the first slide 6.1. The injected beam is then partially reflected and partially transmitted by the semi-reflective coatings 6.4 and 6.9, and is reflected by the reflective coating 6.7, as already described.

Figure 5:
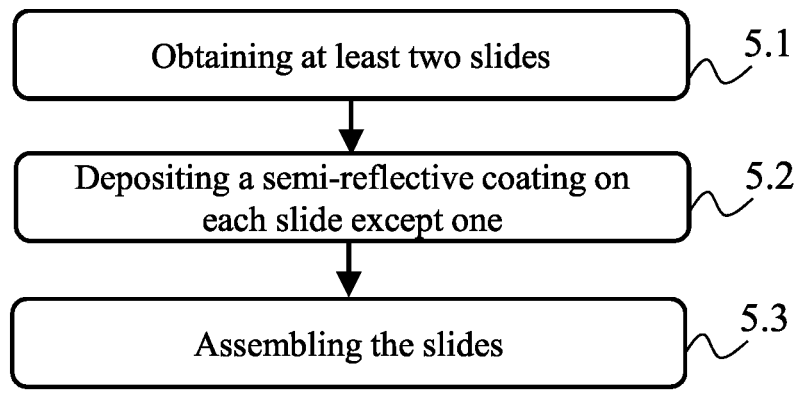

FIG. 5 schematically illustrates a method for manufacturing an optical guide according to the present invention. The optical guide comprises an injection zone intended to inject a light signal into the optical guide and an extraction zone intended to provide the light signal after transport by the optical guide.

In the manufacturing method illustrated in FIG. 5, the guidance elements already mentioned are parallel-face slides. The same principles apply when the guidance elements are not parallel-face slides, in particular when one of the guidance elements comprises, in a juxtaposed manner, the injection and extraction zones already mentioned.

In a step 5.1, at least two slides are obtained. The slides have parallel faces. As already mentioned, they may consist of the same material or different materials, which has an impact on their thicknesses.

In a following step 5.2, a semi-reflective coating is deposited on each slide except one. The semi-reflective coating is deposited in an area situated between the injection zone and the extraction zone. The semi-reflective coating has a length, in the direction of propagation of the light signal in the optical guide, dependent on a minimum angle of incidence of the light signal and on the thickness of at least one of the slides that said semi-reflective coating is intended to separate.

In a following step 5.3, the slides are assembled in a superimposed manner, so that each semi-reflective coating separates two slides.

The assembling step may also be performed so that the edge of at least one of the slides is positioned as presented in relation to FIG. 2 for the third slide 2.1.

The assembling step may in a variant be preceded by a step of depositing an entirely reflective coating as presented above in relation to FIG. 2 for the coating 3.2.

The depositing of semi-reflective coating and the assembling of the slides may be such that the light signal transmitted by a semi-reflective coating between one slide and the following slide in the succession of slides included in the optical guide does not enter said following slide without reflection, as presented above in relation to FIGS. 2 and 3.

The depositing of semi-reflective coating and the assembling of the slides may also be such that the light signal transmitted without reflection by one semi-reflective coating is transmitted by the following semi-reflective coating in a succession of slides included in the optical guide, as presented above in relation to FIG. 4.

The invention claimed is:

1. An optical guide comprising an injection zone intended to inject a light signal into the optical guide and an extraction zone intended to provide the light signal after transport by the optical guide, wherein the optical guide comprises, in a superimposed manner, at least two guidance elements, and wherein, in a zone situated between the injection zone and the extraction zone, the at least two guidance elements are partially separated from each other by a semi-reflective coating with a length, in a direction of propagation of the light signal in the optical guide, dependent on a minimum angle of incidence of the light signal and on a thickness of at least one of the at least two guidance elements that said semi-reflective coating separates.

2. The optical guide according to claim 1, wherein the length of the semi-reflective coating allows at least two rebounds of the light signal on said semi-reflective coating.

3. The optical guide according to claim 1, wherein reflectivity and transmissivity of the semi-reflective coating are substantially equal.

4. The optical guide according to claim 1, wherein the optical guide comprises, in a superimposed manner, at least three guidance elements forming a succession of guidance elements, a plurality of semi-reflective coating with one of said semi-reflective coatings partially separating each of said guidance elements from a following guidance element, and wherein the optical guide is arranged so that the light signal transmitted by each semi-reflective coating is transmitted by a following semi-reflective coating without intermediate reflection.

5. The optical guide according to claim 4, wherein each semi-reflective coating has a reflectivity dependent on its position in the succession of guidance elements, with one of said semi-reflective coatings transmitting the light signal transmitted by another of said semi-reflective coatings having a higher reflectivity than the one of said semi-reflective coatings.

6. The optical guide according to claim 1, wherein the at least two guidance elements each have a same thickness.

7. The optical guide according to claim 6, wherein the at least two guidance elements consist of a same material.

8. The optical guide according to claim 1, wherein the at least two guidance elements are manufactured from different materials, and wherein thicknesses of the at least two guidance elements depend on respective refractive indices and on a minimum angle of incidence of the light signal.

9. The optical guide according to claim 1, wherein the optical guide comprises, in a superimposed manner, at least three guidance elements forming a succession of guidance elements, a semi-reflective coating partially separating each of the guidance elements from a following guidance element, and wherein the optical guide is arranged so that the light signal transmitted by one semi-reflective coating between one guidance element and the following guidance element does not enter said following guidance element without reflection.

10. The optical guide according to claim 9, wherein, for the light signal transmitted by a semi-reflective coating between one guidance element and the following guidance element not to enter said following guidance element without reflection, said guidance element and said following guidance element are partially separated by a reflective coating.

11. The optical guide according to claim 9, wherein, for the light signal transmitted by a semi-reflective coating between one guidance element and the following guidance element not to enter said following guidance element, said following guidance element is absent from a zone of the optical guide where the light signal is transmitted by said semi-reflective coating.

12. The optical guide according to claim 1, wherein the optical guide comprises a group of at least three guidance elements arranged in a superimposed manner so as to form a succession of guidance elements, a semi-reflective coating partially separating each of the guidance elements from a following guidance element, the optical guide being arranged so that the light signal transmitted without reflection by one semi-reflective coating is transmitted by a following semi-reflective coating, and wherein the optical guide comprises at least one other guidance element, a semi-reflective coating partially separating the at least one other guidance element from said group of guidance elements, the optical guide being arranged so that the light signal transmitted by a semi-reflective coating in said group of guidance elements does not enter said at least one other guidance element without reflection.

13. A method for manufacturing an optical guide comprising an injection zone intended to inject a light signal into the optical guide and an extraction zone intended to provide the light signal after transport by the optical guide, wherein the method comprises:

providing at least two guidance elements;

depositing, in a zone situated between the injection zone and the extraction zone, a semi-reflective coating on each of the at least two guidance elements except one, the semi-reflective coating having a length, in a direction of propagation of the light signal in the optical guide, dependent on a minimum angle of incidence of the light signal and on a thickness of at least one of the guidance elements that said semi-reflective coating is intended to separate; and assembling the guidance elements in a superimposed manner, so that each semi-reflective coating separates two guidance elements.

* * * * *